July 20, 1965     J. H. SCHMID     3,195,150
COMBINATION WATER CLOSET, FITTING, AND SEAL THEREFOR
Filed May 2, 1963
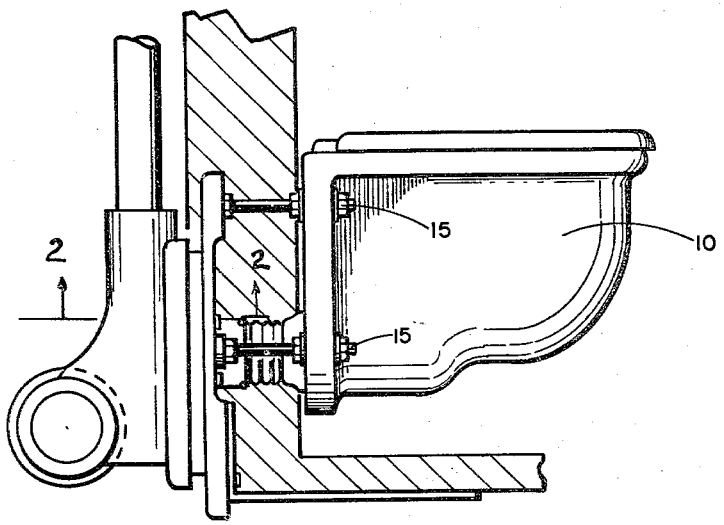
FIG·1
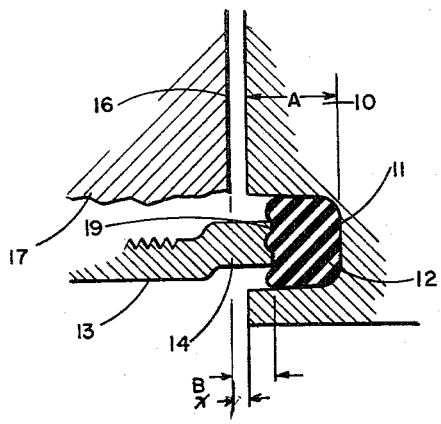
FIG·2
INVENTOR.
JOHN H. SCHMID
BY
Charles L. Lovercheck
attorney 3,195,150
COMBINATION WATER CLOSET, FITTING, AND SEAL THEREFOR
John H. Schmid, Erie, Pa., assignor to Zurn Industries, Inc., Erie, Pa., a corporation of Pennsylvania
Filed May 2, 1963, Ser. No. 277,512
1 Claim. (Cl. 4—252)

This invention relates to seals and, more particularly, to a combination water closet, coupling, and seal therebetween.

It is difficult to prevent leakage between water closets and drainage pipes. The water closet has a tendency to move during use and leakage at the sealing gasket thereby results. Various types of flexible material such as felt have been used as sealing gaskets but many of these develop leaks as they age. Further, during installation, the outlet of the water closet is frequently not perfectly aligned with the coupling. Thus, a non-uniform pressure is exerted on the sealing washer from one side to the other. Leaks often occur due to this and other causes.

It has been discovered that leakage can be prevented by the use of a sealing gasket made of a closed cell expanded polymer which is bonded to the water closet fixture and drainage piping. The gasket could, for example, be bonded to the fixture and piping by means of a rubber base bonding material. When such gasket is used rather than the conventional semi-rigid material, the joint will not leak. Leakage will not occur even when there is considerable relative movement between the water closet and the coupling and when the closet and fitting are not perfectly aligned.

Leakage is avoided in the combination disclosed herein because the amount of compression that is necessary to provide a seal is less critical with the gasket and bonding material disclosed herein than with prior gaskets. Therefore, the accuracy to be maintained by the workmen during installation is reduced and, as a result, the cost of installation may be reduced. Also, any dimensional or other changes in the polymer due to aging or compression will not cause leakage due to the load.

An adhesive which will give the desired results in combination with the sealing gasket aforesaid is, for example, a synthetic rubber base adhesive utilizing toluol as a solvent. A weight per gallon of 7.2 pounds has been found suitable. This adhesive will form a water resistant bond between the gasket and the china of the closet and it will form an equally good bond between the gasket and the cast iron or brass coupling.

It is, accordingly, an object of the present invention to provide an improved combination water closet, gasket, and fitting.

Another object of the invention is to provide an improved sealing gasket made of a closed cell expanded polymer and a coupling.

A further object of the invention is to provide a water closet, coupling, and seal therefor which is simple in construction, economical to manufacture, and simple and efficient in use.

With the above and other objects in view, the present invention consists of the combination and arrangement of parts hereinafter more fully described, illustrated in the accompanying drawing and more particularly pointed out in the appended claim, it being understood that changes may be made in the form, size, proportions, and minor details of construction without departing from the spirit or sacrificing any of the advantages of the invention.

In the drawing:

FIG. 1 is a partial side view of a fitting suitable for water closet use with a sealing ring; and FIG. 2 is an enlarged partial cross sectional view taken on line 2—2 of FIG. 1 of the fitting and water closet with the ring therebetween.

Now with more specific reference to the drawing, a conventional water closet 10 and fitting 13 using the improved seal 12 are shown. The water closet 10 has a recess 11 therein which receives the seal or sealing compression type gasket 12. The sealing gasket 12 is generally rectangular in cross section and is made of a closed cell expanded polymer such as neoprene.

The gasket 12 is held in the annular recess 11 by an adhesive; for example, a synthetic rubber base adhesive dissolved in toluol and having a weight of 7.2 pounds per gallon. The adhesive used must be capable of forming a water resistant bond between the polymer and china or cast iron or brass. It must be fluid and capable of air drying and curing or polymerizing when in position.

The fitting 13 is in the form of a hollow cylinder having an end 14 which engages the gasket 12. The end 14 is generally flat with or without a groove 19 therein which engages the face of the sealing gasket 12 and forms a seal therewith. When bolts 15 are tightened, they squeeze the gasket 12 between the fitting 13 and the closet 10. A clearance is allowed at 16 between a wall 17 and the closet 10 so that the wall will not interfere with the closet.

To insure adequate seal at the outlet of the water closet, the front end of the fitting should be located to compress the gasket adequately when the closet and fitting are in the desired location. The dimensions will vary, depending upon the depth of the recess 11 in the closet. The following formula can be used to determine the distance the fitting should extend outwardly from the front edge of the wall 17 when the gasket 12 is three-fourth inch thick before compression:

Let
$A$ = depth of recess
$X$ = distance closet is to be located from finished wall
$B$ = distance fitting should extend in front of finished wall Thus $$A + X - \tfrac{1}{2} \text{ inch} = B$$

It is important that the bearing nuts and washers be located in such manner as to establish and maintain dimension X as above.

A gasket as above described will prevent leakage regardless of substantial misalignment of parts, vibration, and shifting of the closet relative to the fitting. Prior to this invention, felt gaskets and the like leaked under such circumstances. Because of the cellular nature of the gasket disclosed herein, there can be considerable movement between the closet and the fitting without developing any leakage therebetween.

The foregoing specification sets forth the invention in its preferred practical forms but it is understood that the structure shown is capable of modification within a range of equivalents without departing from the invention which is to be understood is broadly novel as is commensurate with the appended claim.

The embodiments of the invention in which an exclusive property or privilege is claimed are defined as follows:

In combination, a closet, a hollow coupling, and a resilient gasket,
    said closet having an outlet with an annular recess generally concentric thereto,
    said gasket being in the form of a ring washer disposed in said recess,
    one end of said coupling engaging said gasket whereby said gasket forms a seal between said closet and said coupling, said gasket being made of a closed cell expanded polymer.

References Cited by the Examiner

UNITED STATES PATENTS

| | | | |
|---|---|---|---|
| 2,107,663 | 2/38 | Franck | 4—252 |
| 2,219,289 | 10/40 | Bennett | 285—291 X |
| 2,995,057 | 8/61 | Nenzell | 277—171 X |
| 3,020,565 | 2/62 | Manas et al. | 4—252 |

OTHER REFERENCES

The Story of Neoprene, Du Pont News Bulletin, February 1937, page 5, second indented paragraph.

EDWARD V. BENHAM, *Primary Examiner.*

LEWIS J. LENNY, *Examiner.*